(12) United States Patent
Brennan

(10) Patent No.: US 6,725,855 B1
(45) Date of Patent: *Apr. 27, 2004

(54) PORTABLE TAILGATING APPARATUS

(76) Inventor: Daniel A. Brennan, 7720 Records St., Indianapolis, IN (US) 46240

( * ) Notice: Subject to any disclaimer, the term of this patent is extended or adjusted under 35 U.S.C. 154(b) by 0 days.

This patent is subject to a terminal disclaimer.

(21) Appl. No.: 10/410,900

(22) Filed: Apr. 10, 2003

Related U.S. Application Data

(63) Continuation-in-part of application No. 09/976,623, filed on Oct. 12, 2001, now Pat. No. 6,575,155.
(60) Provisional application No. 60/240,430, filed on Oct. 13, 2000, now abandoned, and provisional application No. 60/373,062, filed on Apr. 16, 2002, now abandoned.

(51) Int. Cl.[7] .......................... F24C 3/00; B62D 53/00; B60R 9/00
(52) U.S. Cl. ................... 126/41 R; 126/276; 99/449; 280/406.2; 280/407; 224/519
(58) Field of Search .................. 126/41 R, 25 R, 126/276, 266; 99/449; 280/406.2, 407, 497; 224/519, 521

(56) References Cited

U.S. PATENT DOCUMENTS

| | | |
|---|---|---|
| 2,608,191 A | 8/1952 | Schmidt et al. |
| 4,089,554 A | 5/1978 | Myers |
| 4,744,590 A | 5/1988 | Chesney |
| 4,941,797 A * | 7/1990 | Smillie, III .................. 414/462 |
| 5,224,636 A | 7/1993 | Bounds |
| 5,443,189 A | 8/1995 | Hirschfeld |
| 5,460,304 A * | 10/1995 | Porter et al. ................. 224/521 |
| 5,640,949 A | 6/1997 | Smith |
| 5,927,745 A | 7/1999 | Cunningham |
| 6,164,896 A * | 12/2000 | Cummins ................... 414/462 |
| 6,168,058 B1 | 1/2001 | Janek |
| 6,260,752 B1 | 7/2001 | Dollesin |
| D449,269 S | 10/2001 | Gower |
| 6,305,705 B1 | 10/2001 | Cook |
| 6,575,155 B2 * | 6/2003 | Brennan .................... 126/41 R |
| 2003/0173122 A1 * | 9/2003 | Cassoni ..................... 180/65.1 |

* cited by examiner

Primary Examiner—Henry Bennett
Assistant Examiner—Kathryn Odland
(74) Attorney, Agent, or Firm—C. John Brannon

(57) ABSTRACT

A raisable and lowerable platform that houses a removable charcoal or gas grill and a removable cooler chest, with a storage compartment between the two, a telescoping flagpole mounted to the platform, and a fold down table attached on both ends of the platform to provide more cooking area. In the preferred embodiment the platform is connected to a wheeled scissors lift system that is used to raise and lower the platform. The apparatus is carried and transported via a rollered receiver hitch assembly that is an integral part of the scissors lift system and that is conventionally mountable on a transport vehicle.

18 Claims, 6 Drawing Sheets

PORTABLE TAILGATING APPARATUS

REFERENCE TO RELATED APPLICATION

This application claims the benefit of continuation in part of U.S. patent application Ser. No. 09/976,623, filed Oct. 12, 2001 now U.S. Pat. No. 6,575,155 and claiming the benefit of U.S. Provisional Patent Application Serial No. 60/240, 430, filed Oct. 13, 2000, and U.S. Provisional Patent Application Serial No. 60/373,062, filed Apr. 16, 2002 both now abandoned.

BACKGROUND OF THE INVENTION

Avid football fans and pre-game tailgaters have recognized the need for a device that would alleviate the principal problems associated with tailgating: not having enough space to transport all of one's tailgating equipment and supplies, i.e. a grill, a cooler chest, food, team flag and flag pole; and once at the tailgating site, not having enough room to set up the grill and cooler chest. The portable grill and cooler apparatus of the present invention solves these vexing problems now existing in the tailgating art.

SUMMARY OF THE INVENTION

The portable grill and cooler apparatus of the present invention contains everything a person would need to put on a tailgating party. It is an all-in-one tailgating package, and in a preferred embodiment to date, consists of a raisable and lowerable platform that houses a removable charcoal or gas grill and a removable cooler chest, with a storage compartment between the two, a telescoping flagpole mounted to the platform to display team colors, and a fold down table attached on both ends of the platform to provide more cooking area. In the preferred embodiment to date, the platform is connected to a scissors lift system that is used to raise and lower the platform. The apparatus is carried and transported solely via a receiver type hitch assembly one part of which is an integral part of the scissors lift system and one part of which is conventionally mountable on a transport vehicle. The scissors lift system can be used to mount the apparatus to a transport vehicle without the need to physically lift the apparatus. On the bottom of the scissors lift system of the preferred embodiment to date are four caster wheels. Thus, when detached from the transport vehicle, the apparatus can be easily moved, utilizing the caster wheels, again without physical lifting. The castor wheels are not used in the transport of the apparatus by a transport vehicle. The ability to carry and move the apparatus without having to physically lift the apparatus at any time is thus unique.

Another preferred embodiment of the present invention to date has been a portable grill and cooler apparatus, comprising a platform housing a grill and a cooler chest; a lift device attached to the platform that raises the platform from a transport position to a use position and lowers the platform from the use position to the transport position, and that removably attaches the platform to a transport vehicle; and wheels attached to the lift device on which the platform and lift means are wheeled when the platform and lift means are detached from a transport vehicle but on which they are not wheeled when the platform is in the transport position and is attached to a transport vehicle.

Related objects and advantages of the present invention will be evident from the following descriptions.

DETAILED DESCRIPTION OF THE PREFERRED EMBODIMENTS

Figure 2:
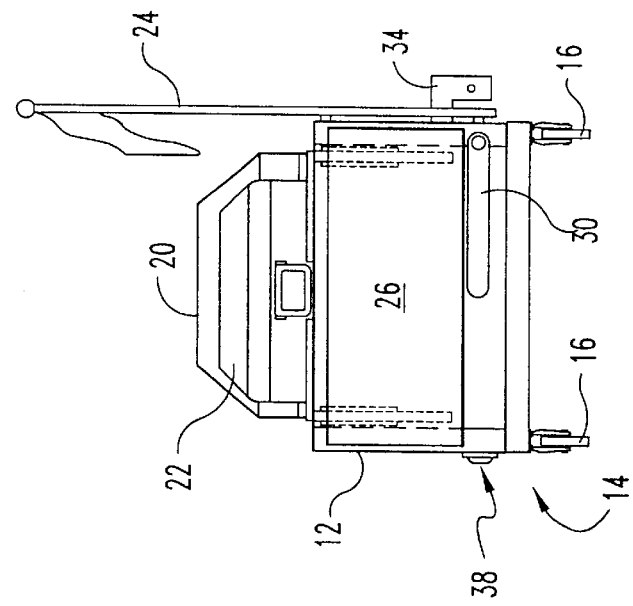
FIG. 2 is a right side view of the apparatus of FIG. 1.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 3:
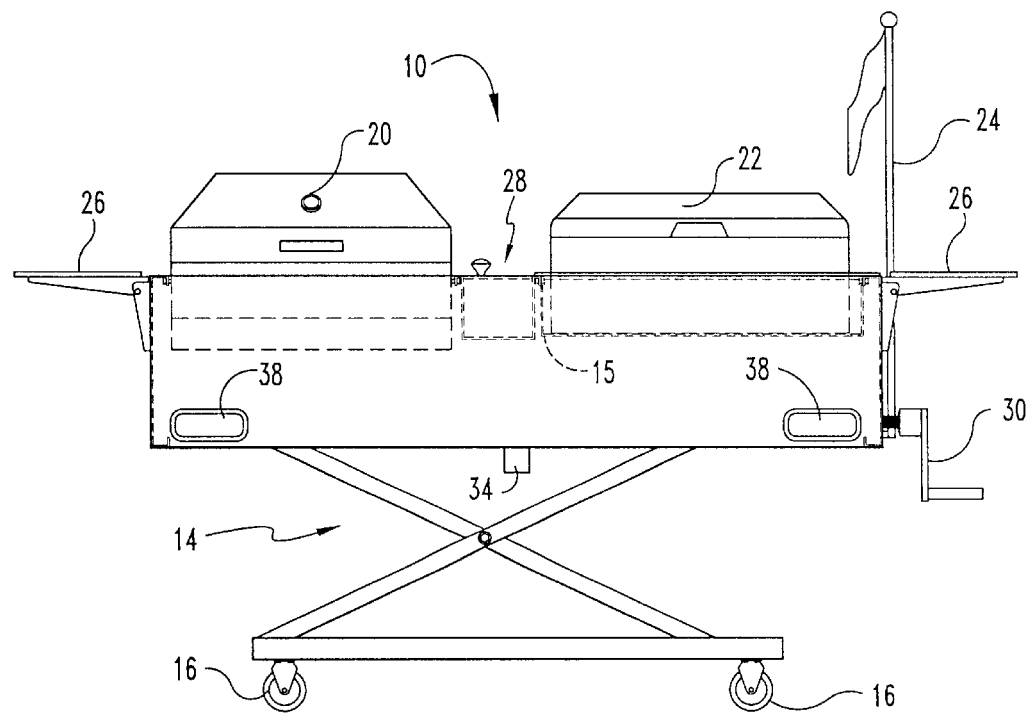
FIG. 3 is a front elevational view of the apparatus of FIG. 1 in the use position.
Figure 5:
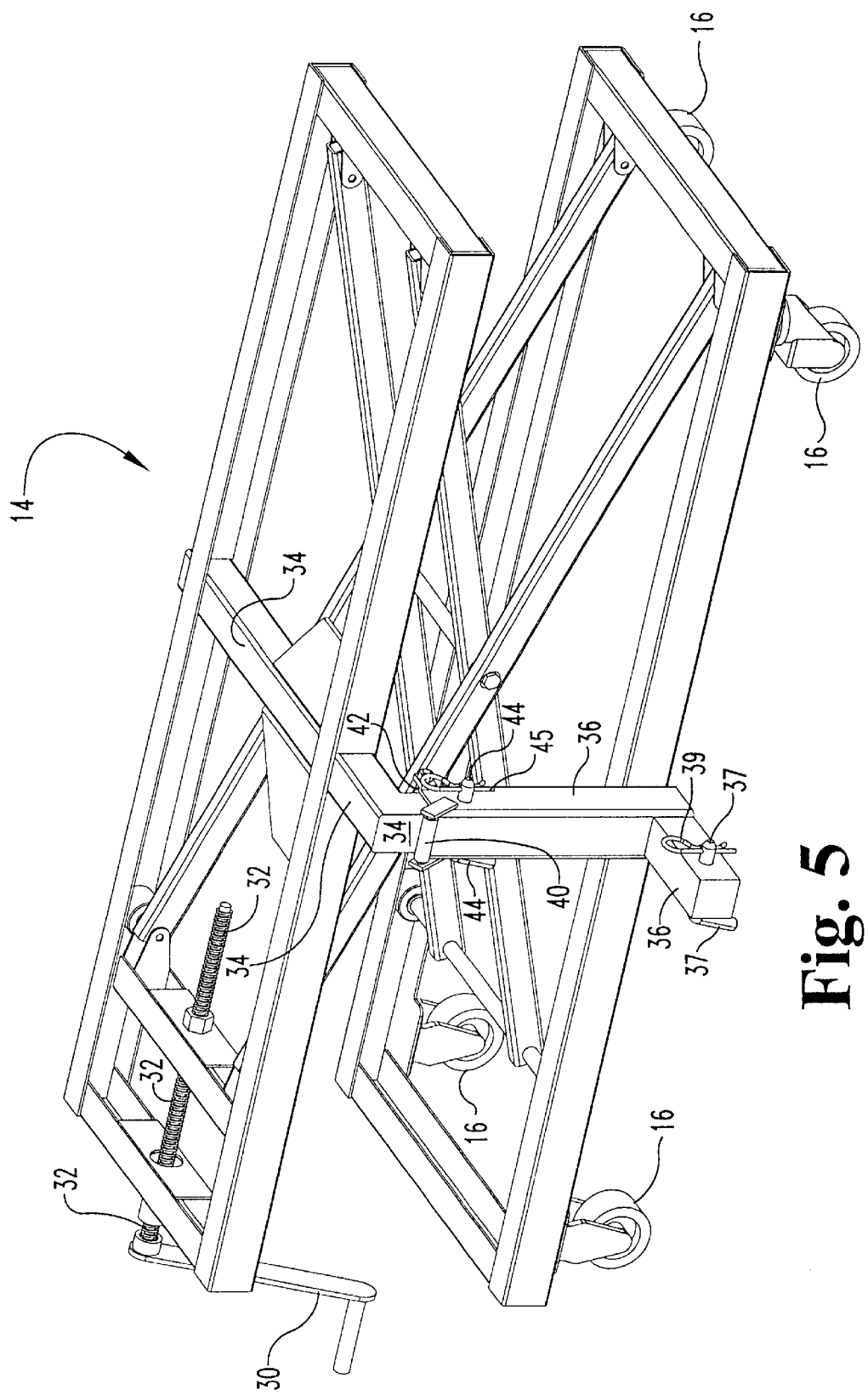
FIG. 5 is perspective view of a preferred embodiment of the scissors lift system of the present invention.
Figure 6:
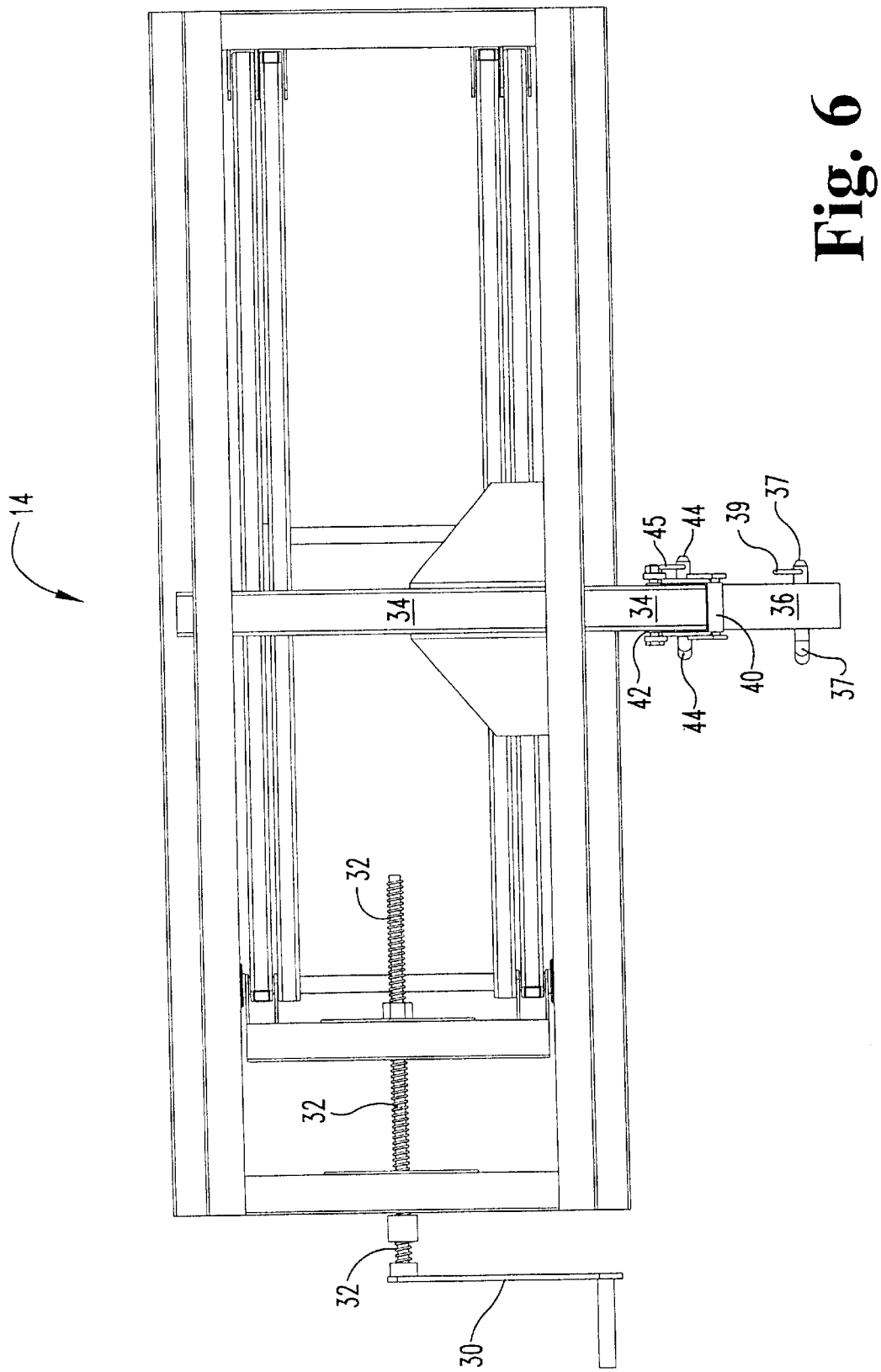
FIG. 6 is a top plan view of the scissors lift system of FIG. 5.

Turning now to the drawings, the portable grill and cooler apparatus 10 of the present invention comprises an all-in-one tailgating package, consisting of a raisable and lowerable platform 12 that houses a removable charcoal or gas grill 20 and a removable refrigerator or cooler chest 22, with a storage compartment 28 between the two, a telescoping flagpole 24 mounted to the platform 12 to display favorable team colors, and a fold down table 26 attached on both ends of the platform 12 to provide more cooking area. The platform 12 is raisable to a use position (FIG. 3) and lowerable to a transport position (FIGS. 1 and 2) in the preferred embodiment to date by a conventional manual scissors lift system 14 (FIGS. 5 and 6) that uses a hand crank 30 to turn a threaded rod 32 that is connected to the scissors arms of the scissors lift system 14 (FIGS. 5 and 6). Attached to the bottom of the scissors lift system 14 are four (4) caster wheels 16 to provide mobility to the apparatus 10 when in the use position (FIG. 3). The wheels 16 play no part in the transport of the apparatus 10 in the use position and mounted to a transport vehicle.

On the backside of the scissors lift system 14 is a 2 inch by 2 inch square hitch tube 34, which is insertable into a novel rollered receiver hitch 36 of the present invention that can be removably inserted into a conventional hitch fitting on a transport vehicle, where the hitch 36 is pinned 37 and locked 39 in place for safety. Since the platform 12 may cover a transport vehicle's taillights when the platform is in the transport position and is attached to a transport vehicle via square hitch tube 34 and rollered receiver hitch 36, two taillights 38 are mounted on the front of the platform 12, with a conventional taillight electrical plug-in being provided at the back of the platform 12 for conventional attachment to the electrical system of a transport vehicle.

The complete portable grill and cooler apparatus 10 is attachable and detachable to a transport vehicle by using the scissors lift system 14. The scissors lift system 14 is raised until square hitch tube 34 is above the height of the rollered receiver hitch 36 when mounted and pinned 37 and locked 39 to a transport vehicle (see FIG. 5). The apparatus 10 is then rolled on wheels 16 into place such that the square hitch tube 34 is over the rollered receiver hitch 36, and then the scissors lift system is lowered into the transport position (FIGS. 1 and 2) with the square hitch tube 34 received within rollered receiver hitch 36 (FIG. 5). Rollers 40, 42 at the top of rollered receiver hitch 36 ease the insertion of square hitch tube 34 of the scissors lift system and prevents the pieces from binding when the apparatus 10 and a transport vehicle are on unleveled ground, for example. When the scissors lift system is fully lowered into the transport position and the square hitch tube 34 has been pinned and locked in place within rollered receiver hitch 36 with conventional hitch pin 44 and lock 45 (FIG. 5), and the taillights 38 have been electrically connected to a transport vehicle's electrical system, the apparatus 10 is transportable by a transport vehicle without further ado. Again, note that the wheels 16 would not be touching the ground. Reversing theses steps would place the apparatus 10 in the use position (FIG. 3), ready for a tailgating party.

Figure 4:
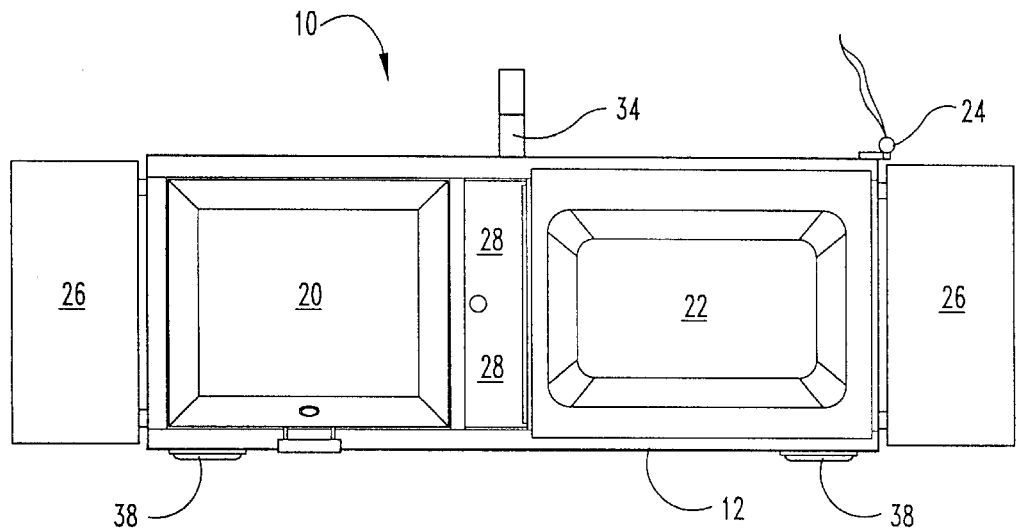
FIG. 4 is a top plan view of the apparatus of FIG. 3.

Being able to provide all of the necessary equipment to tailgate in one easily transportable and easily moveable platform 12 makes the portable grill and cooler apparatus 10 of the present invention a unique product. Everything associated with tailgating is within arms reach. In the preferred embodiment to date, both the grill 20 and the cooler chest 22 are removable from platform 12 so they can be used elsewhere. They fit within correspondingly sized openings in the top of platform 12 (FIG. 4). Grill 20 is removably bolted to platform 12 (FIG. 3) and cooler chest 22 rests upon and is held is place by metal strapping 15 that is attached to platform 12 (FIG. 3).

The flagpole 24 of the preferred embodiment telescopes out to 15 feet. The fold out tables 26 on each end increases preparation space. The box 28 is useful for storing tailgating cooking utensils. The cooler chest 22, grill 20 and storage box 28 are all lockable to prevent vandalism or theft.

Figure 1:
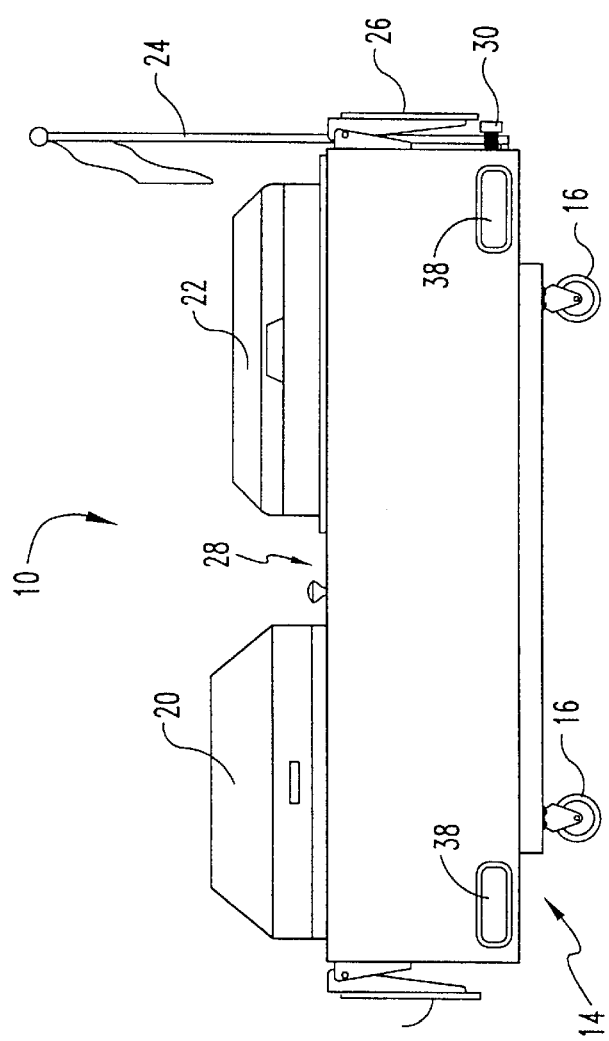
FIG. 1 is a front elevational view of a first embodiment of the apparatus of the present invention in the transport position.

The general steps that are necessary to utilize the portable grill and cooler apparatus 10 of the preferred embodiment to date of the present invention may be summarized as follows. Wheel the apparatus 10, appropriately loaded for tailgating, to a transport vehicle. Insert, pin 37 and lock 39 the rollered receiver hitch 36 within the conventional hitch assembly of the transport vehicle. Connect the taillights 38 to the electrical system of the transport vehicle. Wheel the apparatus 10 toward the transport vehicle until square hitch tube 34 is over the rollered receiver hitch 36. Crank down the scissors lift system 14 until the square tube 34 is the appropriate distance within rollered receiver hitch 36 and insert pin 44 and lock 45. Continue to crank the scissors lift system down until the caster wheels 16 are off the ground and all the way up under the platform 12 into the transport position (FIGS. 1 and 2). The apparatus 10 is ready for transportation to the tailgate party site.

For set up at tailgating destination, remove the electrical plug for taillights 38 and crank down the castor wheels 16, utilizing the scissors lift system 14 to ground level. Pull the lock 45 and pin 44 from the rollered receiver hitch 36 and raise the scissors lift systems 14 further until the square hitch tube 34 is free of the rollered receiver hitch 36 and the platform 12 is in the use position. Wheel and position the apparatus 10 on level ground. Raise the telescoping flagpole 24, and lock side tables 26 in place. The apparatus 10 is now in the grilling and chilling mode.

Reload the apparatus 10 after the tailgating event in the reverse sequence and head home in a transport mode.

In the preferred embodiment to date, the scissors lift system 14, fully illustrated in FIGS. 5 and 6, and the platform 12 have been manufactured from mild steel that has been painted with powdered coated paint to prevent rust. The steel for constructing platform 12 has been preferably 20-gauge sheet steel. The preferred plan view (FIG. 4) dimensions of platform 12 have been 64"×24"×18", with an empty weight of the apparatus 10 of about 175 pounds. In the transport position, the preferred height of the apparatus 10 has been about 22" and in the use position about 40". The grill 20 of the preferred embodiment to date has been either a 23"×17" BRINKMAN brand charcoal or gas grill Model King Swivel or propane gas grill. A propane gas grill would require a propane gas source, which to date has been a propane tank hung on a short tubular extension to the top surface of square hitch tube 34. The preferred cooler chest 22 to date has been a 50-quart COLEMAN brand cooler chest. Alternately, a miniature refrigerator 22 may be selected. The refrigerator may be powered via electrical connection to the vehicle's power source, or may be powered by a battery or generator positioned within the housing platform 12. Side tables 26 have been preferably sized at 19"×8".

While the apparatus of the invention has been described above in use with a portable grill and cooler chest, the platform 12 is adaptable for a wide range of uses, from the tailgating uses of the preferred embodiment to hauling camping gear to carrying potable water to farm animals. Many objects can be moved using the apparatus of the present invention without having to use a pull-behind trailer. It should be appreciated that the portable grilling and cooling apparatus 10 may be modified to house and carry additional items, such as a radio, stereo, audio tape player, CD player, television, video tape deck and/or DVD player, sink, trash compartment, and virtually any device or supplies that may enhance the tailgate party experience. Moreover, the housing/lift/hitch system may be further modified to carry other items than tailgating supplies, such as camping equipment, tools, medical supplies, fuel, firefighting equipment, and the like.

Figure 7:
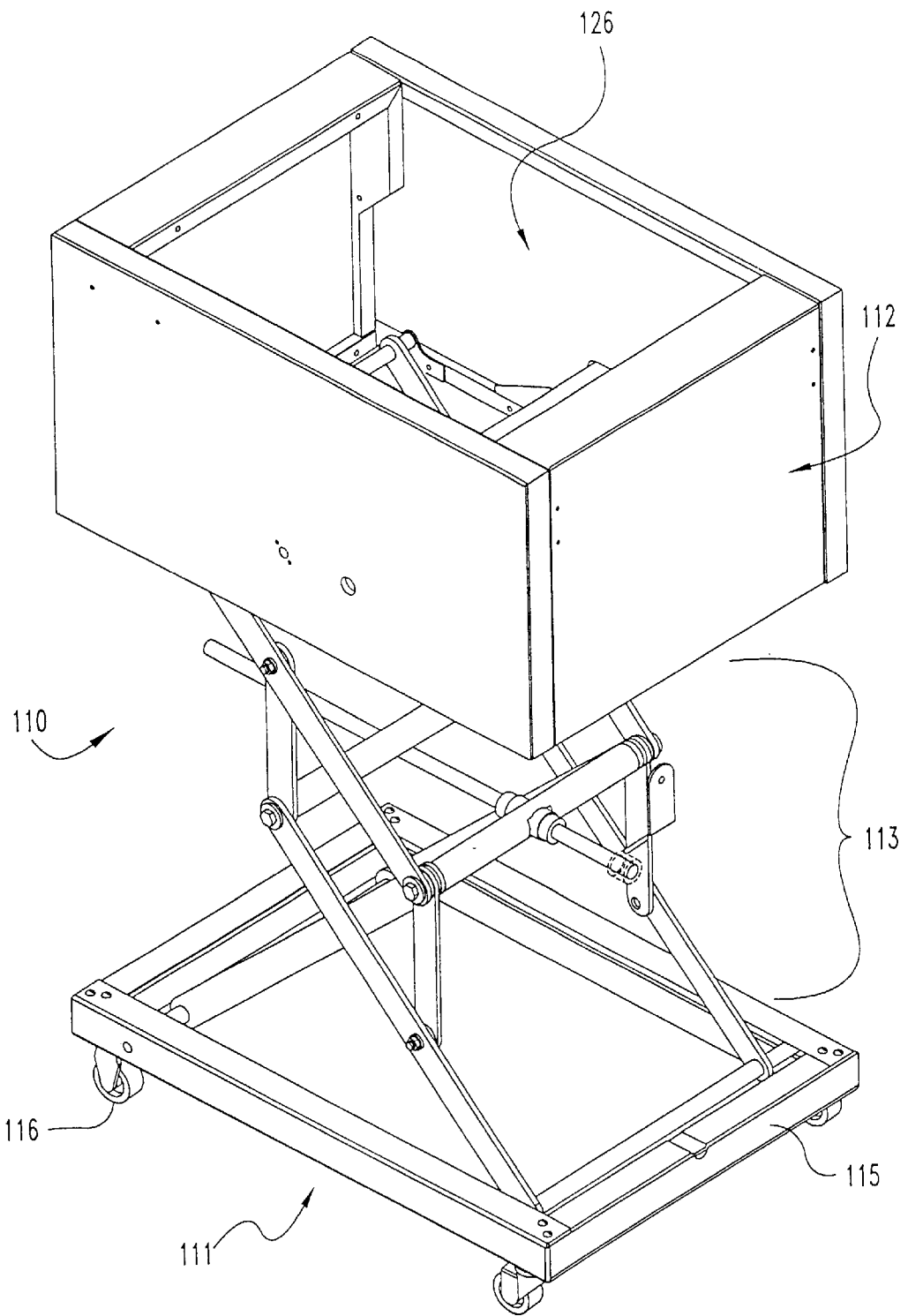
FIG. 7 is perspective view of a second embodiment of the apparatus of the present invention.
Figure 8:
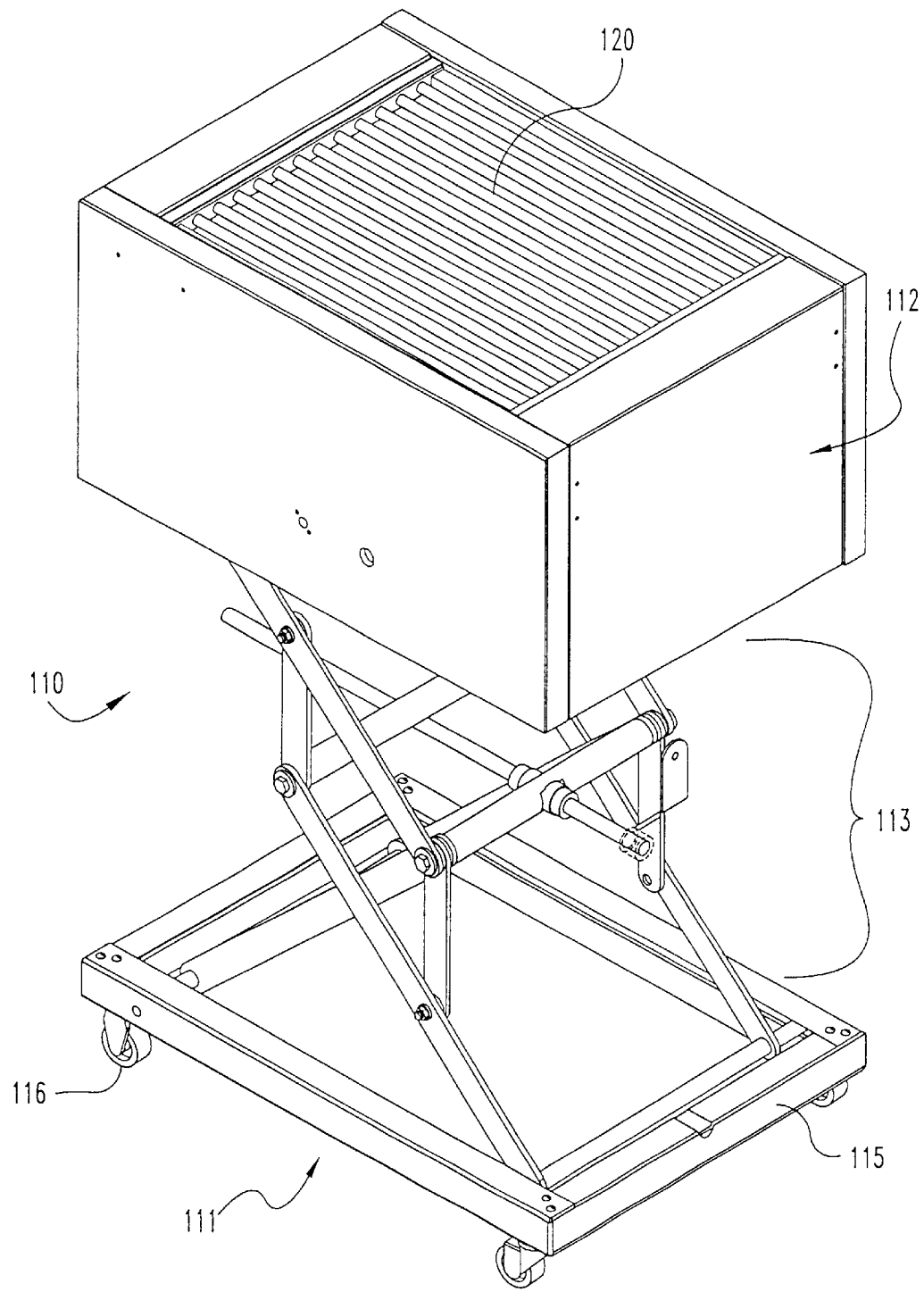
FIG. 8 is a second perspective view of a second embodiment of the apparatus of the present invention.

FIGS. 7–8 illustrate a second embodiment of the present invention, a portable grilling apparatus 110 having a recessed housing platform 112 having at least one recess 126 formed therein for accepting a barbeque grill 120. A wheeled base 111 is connected to the portable grilling apparatus 110, and a lift system 113 is interposed between the base 111 and the recessed platform 112 for moving the wheeled base 111 relative to the platform 110 between a transport position and a use position.

The recess 126 is sized to receive a barbeque grill 120, and may therefore have any shape convenient to accepting a particular barbeque grill, such as rounded or semispherical, or a rectangular parallelepiped.

The wheeled base 111 is preferably a rectangular frame 115 from which wheels 116 downwardly extend. The wheels 116 are preferably caster or pneumatic type, but may alternately be of any type convenient to transporting the portable grill 110 over short distances on relatively flat terrain.

The lift system 113 extends between the wheeled base 111 and the housing 112, and connects to each. In this embodiment, the lift system 111 includes a scissors-type lifting apparatus similar to that of the first embodiment above that may be cranked to alternately extend or diminish the distance between the housing 112 and the base 111. In other contemplated embodiments, the lift system may be of any convenient mechanical or electromechanical type, such as a worm drive, a pneumatic or hydraulic lifting assembly, an electric motor drive assembly, or the like.

The portable grilling apparatus 110 is attachable/detachable to a transport vehicle by using the scissors lift system 114. The scissors lift system 114 is raised until the square hitch tube 34 is above the height of the rollered receiver hitch 36 when mounted and pinned 37 and locked 39 to a transport vehicle (see FIG. 5). The apparatus 110 is then rolled on wheels 116 into place such that the square hitch tube 34 is over the rollered receiver hitch 36, and then the scissors lift system is lowered into the transport position with the square hitch tube 34 received within rollered receiver hitch 36. Rollers 40, 42 at the top of rollered receiver hitch 36 ease the insertion of square hitch tube 34 of the scissors lift system and prevents the pieces from binding when the apparatus 10 and a transport vehicle are on unleveled ground, for example. When the scissors lift system 114 is fully lowered into the transport position and the square hitch tube 34 has been pinned and locked in place within rollered receiver hitch 36 with conventional hitch pin 44 and lock 45, and the taillights 38 have been electrically connected to a transport vehicle's electrical system, the apparatus 110 is transportable by a transport vehicle. During transport, the wheels 116 do not touch the ground. Reversing theses steps would place the apparatus 110 in the use position, ready for a tailgating party.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

I claim:

1. A portable tailgating apparatus for attaching to a transport vehicle, comprising:
    a recessed lifting assembly further comprising:
        a recessed housing portion having a first recess and a second recess; and
        a wheeled base portion connected to the recessed housing portion and positionable between a transport position and a deployed position;
        a square hitch tube connected to the recessed lifting assembly; and
        a rollered receiver hitch mountable on the transport vehicle;
        wherein the first recess is sized to receive a gas grill;
        wherein the second recess is sized to receive a refrigerator;
        wherein the wheels are spaced from the ground in the transport position;
        wherein the square hitch tube is receivable within the rollered receiver hitch that is mountable on a transport vehicle; and
        wherein the rollered receiver hitch eases insertion of the square hitch tube thereinto to prevent binding on unleveled ground.

2. The portable tailgating apparatus of claim 1 further comprising a gas grill positioned in the first recess and a refrigerator positioned in the second recess.

3. The portable tailgating apparatus of claim 2 wherein the refrigerator is a cooler chest.

4. The portable tailgating apparatus of claim 2 wherein the grill is a removable gas grill and the cooler chest is removable.

5. The portable tailgating apparatus of claim 2 and further comprising at least one generally flat food preparation surface operatively connected to the housing portion.

6. The portable grill and cooler apparatus of claim 2 and further comprising a plurality of foldingly deployable tables mounted on the platform.

7. A portable grill and cooler apparatus for attaching to a transport vehicle, comprising:
    a propane grill;
    a refrigerator;
    a recessed housing assembly further comprising:
        a recessed housing portion having a top surface, a side surface, a first recess and a second recess; and
        a wheeled base portion;
        a square hitch tube connected to the recessed housing assembly; and
        a rollered receiver hitch mountable on the transport vehicle;
        wherein the square hitch tube is receivable within the rollered receiver hitch that is mountable on a transport vehicle;
        wherein the square hitch tube lockingly connects to the rollered receiver hitch to define a transport position;
        wherein the first recess is sized to receive the propane grill;
        wherein the second recess is sized to receive the refrigerator;
        wherein the wheels are spaced from the ground in the transport position; and
        wherein the rollered receiver hitch eases insertion of the square hitch tube thereinto to prevent binding on unleveled ground.

8. The portable grill and cooler apparatus of claim 7 and further comprising a mechanical lift portion extending between the recessed housing portion and the wheeled base portion and adapted to raise the recessed housing portion from a transport position to a use position and to lower the recessed housing portion from the use position to the transport position.

9. The portable grill and cooler apparatus of claim 7 and further comprising an electrical power source positioned within the recessed housing and electrically connected to the refrigerator.

10. The portable grill and cooler apparatus of claim 7 wherein the first recess is formed in the top surface of the housing and wherein the second recess is formed in the side surface of the housing.

11. A tailgating assembly that may be connected to and carried by a vehicle, comprising:
    a grill;
    a refrigerator;
    a television;
    a recessed housing platform having a first recess, a second recess, and a third recess;
    a square male hitch tube connected to the recessed housing platform; and
    a rollered square female receiver hitch mountable on the vehicle;
    wherein the rollered receiver hitch lockingly connects to the square male hitch tube to define a transport position;
    wherein the first recess is sized to receive the grill;

wherein the second recess is sized to receive the refrigerator;

wherein the third recess is sized to receive a television;

wherein the recessed housing platform is spaced from the ground in the transport position;

wherein the square male hitch tube is receivable within the rollered receiver hitch; and wherein the rollered receiver hitch cases insertion of the square hitch tube thereinto on unlevel ground.

12. The tailgating assembly of claim 11 further comprising
a wheeled base;
a lift system interposed between the base and the recessed platform for moving the wheeled base relative to the platform between a transport position and a use position.

13. The tailgating assembly of claim 11 further comprising a telescoping flagpole connected to the recessed platform.

14. The tailgating assembly of claim 11 further comprising at least one fold down table connected to the recessed platform.

15. The tailgating assembly of claim 11 further comprising a storage compartment formed in the recessed platform and positioned adjacent the grill and the refrigerator.

16. The tailgating assembly of claim 11 further comprising taillights connected to the platform, wherein the taillights are electrically connectable to the vehicle.

17. A tailgating assembly that may be connected to and carried by a vehicle, comprising:
a grill;
a recessed housing platform having at least one recess;
a wheeled base;
a scissors lift system interposed between the base and the recessed platform for moving the wheeled base relative to the platform between a transport position and a use position;
a square male hitch tube connected to the recessed housing platform; and
a rollered square female receiver hitch mountable on the vehicle;

wherein the rollered receiver hitch lockingly connects to the square male hitch tube to define a transport position;

wherein the at least one recess is sized to receive the grill;

wherein the recessed housing platform is spaced from the ground in the transport position;

wherein the square male hitch tube is receivable within the rollered receiver hitch; and wherein the rollered receiver hitch eases insertion of the square hitch tube thereinto on unlevel ground.

18. A tailgating assembly that maybe connected to and carried by a vehicle, comprising:
a recessed housing platform having at least one recess;
a grill removably positioned in the at least one recess;
a wheeled base;
a scissors lift system interposed between the base and the recessed platform for moving the wheeled base relative to the platform between a transport position and a use position;
a square male hitch tube connected to the recessed housing platform; and
a rollered square female receiver hitch mountable on the vehicle;

wherein the rollered receiver hitch lockingly connects to the square male hitch tube to define a transport position;

wherein the recessed housing platform is spaced from the ground in the transport position;

wherein the square male hitch tube is receivable within the rollered receiver hitch; and wherein the rollered receiver hitch eases insertion of the square hitch tube thereinto on unlevel ground.

* * * * *